(12) United States Patent
Collot et al.

(10) Patent No.: US 6,679,112 B2
(45) Date of Patent: Jan. 20, 2004

(54) TOTAL PRESSURE DETERMINATION WITH MULTIFUNCTION PROBE FOR AIRCRAFT

(75) Inventors: Lionel Collot, Vendome (FR); Joël Choisnet, Naveil (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 10/148,200

(22) PCT Filed: Dec. 12, 2000

(86) PCT No.: PCT/FR00/03488
§ 371 (c)(1),
(2), (4) Date: Jun. 7, 2002

(87) PCT Pub. No.: WO01/44820
PCT Pub. Date: Jun. 21, 2001

(65) Prior Publication Data
US 2002/0184943 A1 Dec. 12, 2002

(30) Foreign Application Priority Data
Dec. 17, 1999 (FR) .............................................. 99 15996

(51) Int. Cl.[7] .......................... A63B 53/00; G01P 13/00; G01W 1/00
(52) U.S. Cl. ..................................................... 73/170.04
(58) Field of Search .......................... 73/170.1, 170.02, 73/170.3, 170.4, 170.05, 861.65, 861.66, 861.67, 861.68

(56) References Cited

U.S. PATENT DOCUMENTS

| 4,672,846 A | | 6/1987 | LeBlond et al. |
|---|---|---|---|
| 4,797,603 A | | 1/1989 | Choisnet |
| 4,972,725 A | | 11/1990 | Choisnet |
| 5,010,775 A | | 4/1991 | Choisnet |
| 5,406,839 A | | 4/1995 | Leblond et al. |
| 5,423,209 A | * | 6/1995 | Nakaya et al. ................ 73/182 |
| 5,797,105 A | * | 8/1998 | Nakaya et al. ................ 701/7 |
| 5,866,813 A | * | 2/1999 | Nakaya et al. ................ 73/147 |
| 6,091,335 A | | 7/2000 | Breda et al. |
| 6,490,510 B1 | * | 12/2002 | Choisnet ....................... 701/14 |

FOREIGN PATENT DOCUMENTS

| FR | 2 665 539 | 2/1992 |
|---|---|---|
| WO | 99 61923 | 12/1999 |

* cited by examiner

Primary Examiner—William Oen
(74) Attorney, Agent, or Firm—Oblon, Spivak, McClelland, Maier & Neustadt, P.C.

(57) ABSTRACT

A multifunction probe for aircraft to determine in particular the static pressure and the total pressure of an airflow located in the vicinity of the aircraft and the angle of incidence of the aircraft with respect to the airflow. The probe includes a movable blade configured to orient itself along the axis of the airflow. The movable blade includes at least one static pressure tap orifice located on one side of the blade and a pressure tap configured to measure the angle of incidence of the blade with respect to the airflow. The probe further includes a pressure measurement device associated with each pressure tap and a device to calculate the total pressure of the airflow as a function of the measurements carried out by the various measurement devices of the probe.

12 Claims, 1 Drawing Sheet

TOTAL PRESSURE DETERMINATION WITH MULTIFUNCTION PROBE FOR AIRCRAFT

BACKGROUND OF THE INVENTION

1. Field of the Invention

The invention pertains to a multifunction probe for aircraft, intended for determining aerodynamic parameters of an airflow surrounding the aircraft.

2. Discussion of the Background

The piloting of any aircraft involves knowing the relative speed of the aircraft with respect to the airflow surrounding it, that is to say to the relative wind. This speed is determined with the aid of sensors of the static pressure Ps, of the total pressure Pt and of the angle of incidence $\alpha$. $\alpha$ provides the direction of the speed vector in a reference system tied to the aircraft and Pt-Ps provides the modulus of this vector. The three aerodynamic parameters therefore make it possible to determine the speed vector of an airplane and, as the case may be, of a so-called convertible tilt-rotor aircraft.

The invention pertains more especially to a probe comprising a movable blade intended to orient itself along the axis of the flow. In a known manner, the movable blade comprises several pressure taps suitable for the measurement of each parameter. The blade comprises in particular a first total pressure Pt tap in the form of an orifice opening out perpendicularly to the flow. This orifice can be placed at the end of a tube whose axis is substantially parallel to the flow. This tube is better known as a Pitot tube.

The blade also comprises a second static pressure Ps tap. Customarily, this second tap comprises two orifices each located on one of the faces of the blade. These two orifices are in communication with a chamber located inside the blade. The chamber makes it possible to average the pressure between the two orifices of the second pressure tap.

The blade also comprises a third pressure tap making it possible to determine the angle of incidence $\alpha$ of the blade with respect to the ambient airflow. This third pressure tap comprises, like the static pressure tap, two orifices, each located on one of the faces of the blade. However, unlike in the case of the static pressure Ps tap, the two orifices of the angle of incidence $\alpha$ pressure tap do not communicate with one another and the pressure difference between the two orifices makes it possible to determine the angle of incidence $\alpha$ of the blade. In order to improve the sensitivity of the measurement of angle of incidence $\alpha$, these two orifices are located in the vicinity of the leading edge of the blade.

The blade described above comprises a pressure tap for each parameter to be measured. Each pressure tap comprises one or more orifices linked by channels to pressure sensors which are usually located in the base of the probe. This base being fixed, it is necessary to provide a rotating pneumatic manifold so as to link each orifice located in the moving blade to the pressure sensor associated therewith in the fixed part of the probe.

SUMMARY OF THE INVENTION

The aim of the invention is to simplify the probe by reducing the number of pressure taps, the number of channels and consequently the construction of the rotating pneumatic manifold while ensuring the determination of the three aerodynamic parameters Pt, Ps and $\alpha$.

To achieve this aim, the subject of the invention is a multifunction probe for aircraft intended for determining in particular the static pressure and the total pressure of an airflow located in the vicinity of the aircraft and the angle of incidence of the aircraft with respect to the flow, the probe comprising a movable blade intended to orient itself along the axis of the airflow, the movable blade comprising at least one static pressure tap orifice located on one side of the blade and a pressure tap intended for measuring the angle of incidence of the blade with respect to the flow, characterized in that the probe furthermore comprises pressure measurement means associated with each pressure tap and means for calculating the total pressure of the flow as a function of the measurements carried out by the various measurement means of the probe.

By dispensing with any total pressure tap in the blade in accordance with the invention it is possible to simplify other constituents of the probe such as in particular the deicing circuit required to avoid the formation of ice on the blade when the aircraft is flying at high altitude and is subjected to temperatures markedly below zero degrees Celsius. The ice may modify the aerodynamic shape of the blade and obstruct the orifices of the pressure taps, thereby causing erroneous measurements of the aerodynamic parameters. The deicing circuit is commonly made in the form of an electric resistor heating the body of the blade. A Pitot tube used as a total pressure Pt tap is relatively voluminous as compared with the blade as a whole and the deicing circuit associated therewith consumes of the order of a third of the electric power required for deicing the blade as a whole. It is readily seen that by dispensing with the Pitot tube it is possible to simplify the deicing circuit.

The invention also finds its benefit when the Pitot tube or more generally the total pressure Pt tap is made some distance from a blade comprising just a static pressure Ps tap and an angle of incidence $\alpha$ pressure tap. The invention consequently makes it possible to do away with the Pitot tube and the corresponding opening in the skin of the aircraft.

DESCRIPTION OF THE DRAWING

The invention will be better understood and other advantages will become apparent on reading the detailed description of an embodiment of the invention, which description is illustrated by the appended drawing in which.

DETAILED DESCRIPTION OF THE INVENTION

Figure 1:
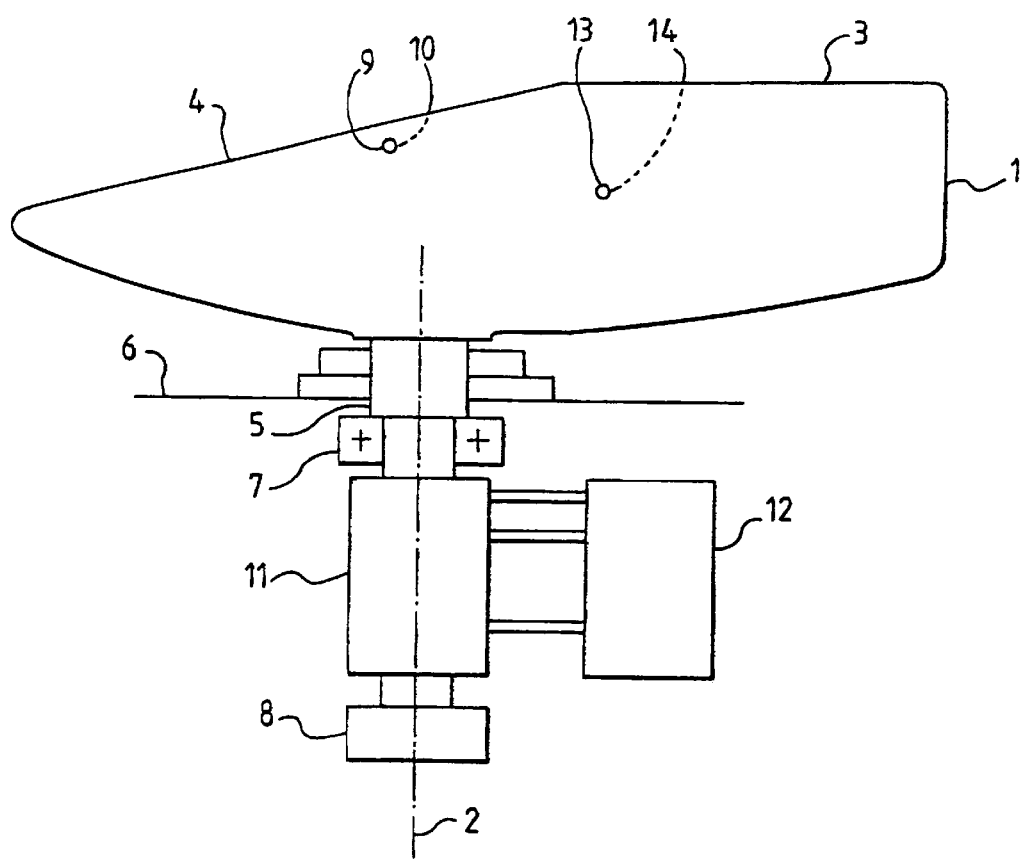
FIG. 1 represents an exemplary embodiment of a probe according to the invention.

The multifunction probe represented in FIG. 1 comprises a movable blade 1 rotatable about an axis 2. The blade 1 comprises a vane 3 possessing a plane of symmetry, parallel to the plane of the figure and separating the pressure surface from the suction surface. The profile of the vane 3 perpendicular to its leading edge 4 is for example of the N.A.C.A. OOZT type. In the example represented, the leading edge 4 is substantially straight and inclined with respect to the axis 2. Other vane shapes can of course be used to implement the invention. The blade 1 also comprises a shaft 5 of axis 2 which penetrates inside the skin 6 of an aircraft. The shaft 5 is movable in rotation with respect to the aircraft, for example, by means of a roller bearing 7. The shaft 5 is secured to means 8 for measuring its angular position about the axis 2. These measuring means 8 comprise for example an optical angle encoder.

Owing to the shape of the vane 3, the blade 1 orients itself naturally along the axis of the air stream surrounding the blade. Consequently, the measurement of the angular position of the shaft 5 available at the output of the measuring means 8 is representative of the angle of incidence α of the aircraft.

Advantageously, the reliability of the measurement of the angle of incidence α can be improved by slaving the angular position of the blade 1 to a measurement of any offset of the plane of symmetry of the vane 3 with respect to the direction of the airflow surrounding the blade 1. This slaving tends to zero this offset. The advantages and the implementation of such slaving are better described in French patent FR 2 665 539 filed on Aug. 3, 1990 in the name of the applicant.

The measurement of the offset of the plane of symmetry of the vane 3 with respect to the direction of the airflow surrounding the blade 1, stated otherwise the angle of incidence of the blade 1, is carried out by means of an angle of incidence pressure tap comprising two orifices 9 and 10, each located on either side of the plane of symmetry of the vane 3 in the vicinity of the leading edge 4.

In FIG. 1, only the orifice 9 is visible. The two orifices 9 and 10 are substantially located equidistant from the leading edge 4, one on the pressure surface and the other on the suction surface of the vane 3. In practice, each orifice can be made by means of several openings located on the relevant face of the vane 3, the various openings of one and the same orifice communicating with a chamber located inside the blade 1.

A rotating pneumatic manifold 11 is linked by way of a channel (not represented in FIG. 1), to each orifice 9 or 10, or to each chamber. The rotating pneumatic manifold 11 delivers the air pressure sensed at the level of the orifices 9 and 10 to processing means 12. The processing means 12 compare the air pressures sensed at the level of the orifices 9 and 10. The comparison is performed, for example, by means of a flow rate meter detecting a discrepancy with respect to a zero airflow rate between the two orifices 9 and 10. As a general rule, the airflow rate is substantially zero owing to the orientation of the blade along the axis of the airflow which surrounds it. However, as was seen above, in order to improve this orientation, it is possible to slave the orientation of the blade 1 about the axis 2 in such a way as to zero the flow rate measurement carried out by the flow rate meter.

The blade furthermore comprises a static pressure Ps tap comprising two orifices 13 and 14 each located on one of the faces of the vane 3 and each located substantially symmetrically with respect to the plane of symmetry of the vane 3. The orifices 13 and 14 are removed substantially far from the leading edge 4 of the vane so as to be less sensitive to the variations in the angle of incidence of the blade 1. Specifically, the closer the orifices are to the leading edge of the blade 1, the greater the pressure difference between the two orifices for a given angle of incidence. The two orifices 13 and 14 are in direct communication with a chamber in which the average pressure existing at the level of each orifice 13 and 14 prevails.

This chamber is linked to the rotating pneumatic manifold 11 by a channel, not represented in FIG. 1.

The rotating pneumatic manifold 11 delivers the average air pressure of the orifices 13 and 14 to the processing means 12.

Advantageously, it is possible to retain just a single orifice located on one of the faces of the blade 1. Specifically, when the blade 1 orients itself along the axis of the airflow either naturally or with the aid of slaving as described above, the pressures sensed on the two faces of the blade 1 symmetrically with respect to the plane of symmetry of the blade 1 are substantially equal and it is therefore possible to dispense with an orifice on one of the faces and consequently with the chamber linking the two orifices each located on one of the faces of the blade 1.

Just as for the angle of incidence pressure tap, the single or the two orifices of the static pressure tap can comprise or can each comprise several openings located on the relevant face of the blade 1, the various openings of one and the same orifice communicating with a chamber located inside the blade 1.

Each orifice is characterized by a pressure coefficient Kp essentially dependent on the shape of the blade, on the position of the orifice on the blade and on the offset of the plane of symmetry of the vane 3 with respect to the direction of the airflow surrounding the blade 1, this offset being otherwise known as the misalignment of the blade.

It is known how to zero this misalignment by natural orientation of the blade along the axis of the airflow surrounding it or better still by using the slaving described above. Consequently, the pressure coefficient Kp of the orifices 9 and 10 is the same and no longer depends on the misalignment of the blade 1, it will subsequently be denoted Kpi. Likewise, the pressure coefficient Kps relating to the orifices 13 and 14 no longer depends on the misalignment of the blade 1. For the angle of incidence pressure tap Kpi is expressed as follows:

$$Kpi = \frac{Pi - Ps\infty}{Pt - Ps\infty} \quad (1)$$

where Pi represents the air pressure at the level of the orifices 9 and 10 (it is recalled that the air pressure at the level of the two orifices 9 and 10 is substantially equal), where Pt represents the total pressure at the level of the blade 1 and where Ps∞ represents the static pressure at upstream infinity of the blade 1.

In the same way, for the static pressure tap, Kps is expressed as follows:

$$Kps = \frac{Ps - Ps\infty}{Pt - Ps\infty} \quad (2)$$

where Ps represents the air pressure at the level of the orifices 13 and 14.

The two pressure coefficients Kpi and Kps depend essentially on the geometrical characteristics of the blade 1 (shape of the blade 1 and position of the orifices 9, 10, 13 and 14) and are therefore, to a first approximation, constant for the relevant blade 1. It is for example possible to determine them experimentally in a wind tunnel.

From equations (1) and (2) it can be deduced that:

$$Ps\infty = \frac{Pi \cdot Kps - Ps \cdot Kpi}{Kps - Kpi} \quad (3)$$

and that $$Pt = \frac{Pi(1 - Kps) - Ps(1 - Kpi)}{Kpi - Kps} \quad (4)$$

It is thus seen that by measuring the pressures Ps and Pi, it is possible to determine the pressures Ps∞ and Pt of the airflow.

More precisely, the pressure coefficient Kp of an orifice is also dependent on the speed of the airflow in the vicinity of this orifice, Kp may then be expressed as follows:

$$Kp = 1 - V^2 \qquad (5)$$

where V is the speed of the airflow at the level of the relevant orifice for a speed at upstream infinity of the blade 1 equal to unity.

Modeling of the coefficients Kpi and Kps as a function of the speed of the flow can be carried out experimentally in a wind tunnel.

Thus to refine the calculation of Ps∞ and Pt, it is firstly possible to calculate these pressures as a function of the values of the pressure coefficients Kps and Kpi, values taken for a zero speed of the airflow. Next, the speed of the flow is calculated for example by determining its Mach number M which may be expressed as follows:

$$M = \sqrt{5\left[\left(\frac{Pt}{Ps\infty}\right)^{2/7} - 1\right]} \qquad (6)$$

From the Mach number M thus calculated it is possible to recalculate new values of Kps and Kpi as a function of the modeling which has been carried out thereof and the pressures Ps∞ and Pt are recalculated by means of equations (3) and (4).

It is possible, by successive iterations, to calculate the speed of the airflow via equation (6) then the value of the pressure coefficients Kps and Kpi at this speed and of new values of Ps∞ and Pt. The iterations are stopped when the accuracy in the values of the pressures Ps∞ and Pt is sufficient, that is to say when the ratio of two successive calculation results is below a specified preset value. The final values of Ps∞ and of Pt, of the Mach number M and of the angle of incidence of the blade 1 make it possible to define the direction and the modulus of the speed vector of the aircraft.

It is noted that, by virtue of the invention, two pressure measurements alone are sufficient to determine the total pressure Pt and hence the modulus of the speed vector of the aircraft. Specifically, by using a movable blade orienting itself along the axis of the airflow, the coefficients Kpi and Kps are dependent only on the speed of the flow and not on the orientation of the blade.

What is claimed is:

1. A multifunction probe for aircraft, comprising:
   a movable blade configured to orient itself along an axis of an airflow located in a vicinity of the aircraft, the movable blade comprising at least one static pressure tap orifice located on one side of the blade and two pressure tap orifices configured to measure an angle of incidence of the blade with respect to the airflow;
   pressure measurement means associated with each pressure tap; and
   means for calculating a total pressure of the airflow as a function of measurements carried out by the pressure measurement means,
   wherein said movable blade is free of any total pressure tap configured to sample said total pressure.

2. The probe as claimed in claim 1, wherein the at least one static pressure tap orifice includes two pressure tap orifices, and each of the two static pressure tap orifices is located on one of faces of the movable blade in a substantially symmetric manner with respect to a plane of symmetry of the movable blade.

3. The probe as claimed in claim 1, wherein movable blade comprises only a single static pressure tap orifice located on one face of the movable blade.

4. The probe as claimed in claim 1, wherein each of the two pressure tap orifices comprises two orifices, each located on one face of the movable blade in a substantially symmetric manner with respect to a plane of symmetry of the movable blade and located in a vicinity of the leading edge of a movable blade.

5. The probe as claimed in claim 2, wherein each of the two pressure tap orifices comprises two orifices, each located on one face of the movable blade in a substantially symmetric manner with respect to a plane of symmetry of the movable blade and located in a vicinity of a leading edge of the movable blade.

6. The probe as claimed in claim 3, wherein each of the two pressure tap orifices comprises two orifices, each located on one face of the movable blade in a substantially symmetric manner with respect to a plane of symmetry of the movable blade and located in a vicinity of a leading edge of the movable blade.

7. The probe as claimed in claim 4, wherein an orientation of the movable blade is slaved by substantially equalizing pressures sensed at a level of the two pressure tap orifices.

8. The probe as claimed in claim 5, wherein an orientation of the movable blade is slaved by substantially equalizing pressures sensed at a level of the two pressure tap orifices.

9. The probe as claimed in claim 6, wherein an orientation of the movable blade is slaved by substantially equalizing pressures sensed at a level of the two pressure tap orifices.

10. A multifunction probe according to claim 1, wherein said means for calculating calculates said total pressure based on pressure coefficients for each of said orifices.

11. A multifunction probe according to claim 10, wherein said means for calculating comprises means for calculating a speed of said airflow.

12. A multifunction probe according to claim 11, wherein said means for calculating comprises means for performing iterations for said pressure coefficients based on said speed.

* * * * *